(12) United States Patent
Bot et al.

(10) Patent No.: US 8,150,390 B2
(45) Date of Patent: Apr. 3, 2012

(54) METHOD OF ROUTING A CALL MADE TO A FIXED TELEPHONE NUMBER OF A UMA-SUBSCRIBER IN A TELECOMMUNICATION NETWORK

(75) Inventors: Johannes Jan Bot, GV Nieuwnedijk (NL); Antoine Den Brok, Rijen (NL); Camilo Morales Barbosa, JZ Maastricht (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 163 days.

(21) Appl. No.: 12/668,539

(22) PCT Filed: Jul. 13, 2007

(86) PCT No.: PCT/NL2007/050350
§ 371 (c)(1),
(2), (4) Date: May 20, 2010

(87) PCT Pub. No.: WO2009/011563
PCT Pub. Date: Jan. 22, 2009

(65) Prior Publication Data
US 2010/0227609 A1    Sep. 9, 2010

(51) Int. Cl.
*H04W 4/00* (2009.01)
(52) U.S. Cl. ............... 455/426.1; 455/432.1; 455/404.2; 455/412.2; 455/444

(58) Field of Classification Search ............... 455/426.1, 455/432.1, 404.2, 412.2, 444
See application file for complete search history.

(56) References Cited

U.S. PATENT DOCUMENTS

| | | |
|---|---|---|
| 2005/0075106 A1* | 4/2005 | Jiang ............................. 455/432.3 |
| 2005/0102635 A1 | 5/2005 | Jiang et al. |
| 2006/0205436 A1* | 9/2006 | Liu et al. ......................... 455/560 |
| 2009/0191878 A1* | 7/2009 | Hedqvist et al. ............... 455/441 |
| 2010/0172283 A1* | 7/2010 | Karaoguz et al. .............. 370/312 |

FOREIGN PATENT DOCUMENTS

| | | |
|---|---|---|
| EP | 1804435 A1 | 7/2007 |
| WO | 99/57915 | 11/1999 |
| WO | 2006/081656 A1 | 8/2006 |

* cited by examiner

*Primary Examiner* — Barry Taylor
(74) *Attorney, Agent, or Firm* — Coats & Bennett, P.L.L.C.

(57) ABSTRACT

The invention relates to a method of routing a call made to a fixed telephone number of a UMA-subscriber in a telecommunication network. A service control entity stores a so-called 'near list' comprising a cell identifier of each cell overlapping a WLAN coverage area of a WLAN AP associated with the UMA-subscriber. The service control entity also receives location information of the UMA-subscriber from a switching node (2) or from a location server (16). If the cell identifier of the serving cell is in the near list, the service control entity prompt the caller to select out of a list of options. If the cell identifier of the serving cell is not in the near list, the caller will be prompted but with a different message and with different options to select. The caller is for example offered the opportunity to wait for the called party to arrive at home, and be dialed back.

8 Claims, 3 Drawing Sheets

METHOD OF ROUTING A CALL MADE TO A FIXED TELEPHONE NUMBER OF A UMA-SUBSCRIBER IN A TELECOMMUNICATION NETWORK

TECHNICAL FIELD

The present invention relates to a method of routing a call made to a fixed telephone number via a mobile telecommunication network. The present invention also relates to a telecommunication network and a service node arranged to execute (part of) the method.

BACKGROUND

Recently, mobile telephone services were introduced wherein a subscriber only needs one single mobile phone that is suitable for calling via Voice Over IP (VOIP) and via GSM/UMTS. If the subscriber resides at home, she may call via a radio based connection like Wireless Local Area Network (WLAN), Wireless Fidelity (WIFI), or Bluetooth. These radio based connections are collectively denoted as UMA (Unlicensed Mobile Access). GSM, UMTS and the like are denoted as GAN (Global Access Networks). Phones capable of connection in both UMA and GAN are denoted as UMA/GAN phones. For a subscriber to use the phones capabilities she needs to have either GAN and UMA subscriptions or a combined UMA/GAN subscription. Below, it is assumed that a subscriber has a combined UMA/GAN subscription. Such a subscriber is simply referred to as a UMA-subscriber.

In co-pending patent application PCT/NL2006/050279 a method of routing a call made by a calling party to a fixed telephone number of a called party is described. The call is routed to a mobile terminal via an Internet Protocol (IP) network and a WLAN access point (AP) associated with the fixed telephone number only when the mobile terminal is located in an area covered by the WLAN AP. The call is routed to an alternative terminating point, such as a voicemail system, if the mobile terminal is located outside the WLAN coverage area. The basic idea of PCT/NL2006/050279 is to provide subscribers with a fixed telephone number the facility to route calls that are made to the fixed telephone number either to a mobile phone of the subscribers when they are located in a so-called 'Home Zone', or else to an alternative terminating point, such as a voice mail of the subscriber that may reside in the telecommunication network of a telecom provider. A Home Zone is determined by an area which is covered by one or more wireless access points. The service which is provided to the subscribers is also referred to as the '@home service'.

In publication EP 1.804.435 A1 a method is described wherein a call to a UMA-subscriber is routed depending on the UMA-subscriber being "at home" or "not at home". The Home Zone in EP 1.804.435 A1 is defined as being a set of GSM cells or a set of distributed WLAN AP. The Home Zone is a low fee area in which the UMA-subscribe may receive calls from a calling party in which case, the latter pays a lower fee than usual.

SUMMARY OF THE INVENTION

A goal of the present invention is to improve the method of the state of the art.

This goal is achieved by providing a method of routing a call made to a fixed telephone number of a UMA-subscriber in a telecommunication network according to the claims. By defining an area 'near home' a caller can be informed about the fact that the called party is almost at home. The caller is for example offered the opportunity to wait for the called party to arrive at home, and call again or be dialed back.

In a further aspect, the invention relates to a telecommunication network comprising a service control entity as described above.

Finally, the invention relates to a computer program product comprising computer executable code, which when loaded on a computer system, allows the computer system to execute the method mentioned above.

BRIEF DESCRIPTION OF THE DRAWINGS

The present invention will be discussed in more detail below, using a number of exemplary embodiments, with reference to the attached drawings, in which.

DETAILED DESCRIPTION OF EXEMPLARY EMBODIMENTS

Figure 1:
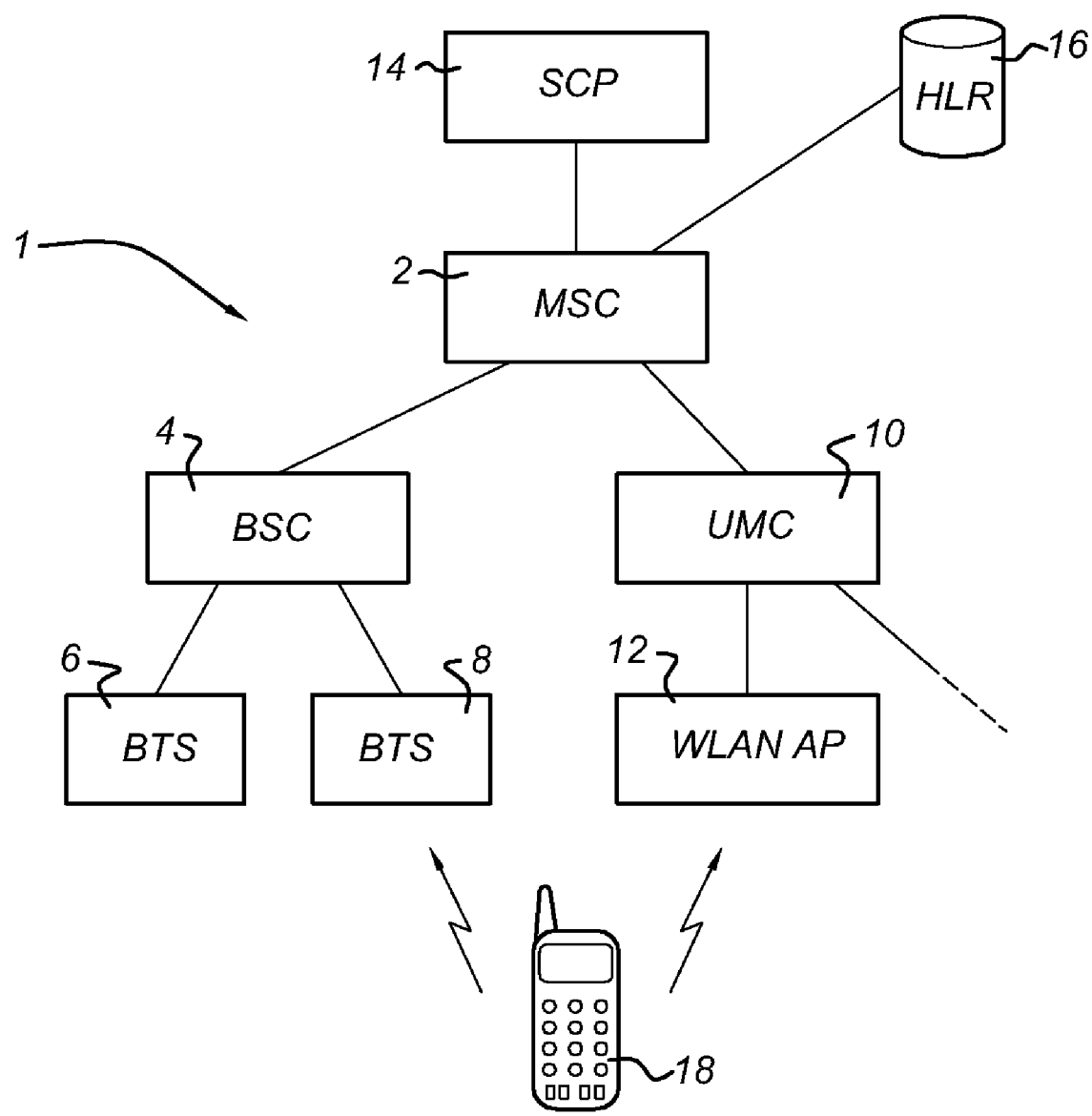
FIG. 1 shows a network diagram which depicts part of a telecommunication network according to an embodiment of the invention.

In FIG. 1, a network diagram is shown which depicts part of a telecommunication network 1 according to an embodiment of the invention. In this simplified example, the telecommunication network 1 comprises a Mobile Switching Centre (MSC) 2, a Base Station Controller (BSC) 4 which controls two Base Transceiver Stations (BTSs) 6, 8. A more generic term for MSC is 'switching node'. Furthermore, the network 1 comprises a UMC 10 and a WLAN AP 12, such as a WiFi enabled modem installed at the UMA-subscriber premises. The telecommunication network 1 also comprises a service control entity, in this example Service Control Point (SCP) 14, and a location server, in this example Home Location Register (HLR) 16. The SCP 14 is the platform on which Intelligent Network (IN) applications are running, as will be clear to the skilled person. A Service Switching Functionality (SSF) is arranged in the MSC 2.

In FIG. 1, a UMA/GAN phone, also referred to a Mobile Station (MS) 18, is depicted which is arranged to communicate both via the WLAN AP 12 and a serving BTS, in this example the BTS 8. If the MS 18 is in a WLAN coverage area of the WLAN AP 12, it will receive calls via the WLAN AP 12 and the UMC 10. How a call is routed to the UMA/GAN phone 12 will be described below in more detail.

In the event where a calling party sets up a call using a fixed number, the MSC 2 receives a ISUP IAM message from a Gateway MSC (not shown in FIG. 1). The fixed number is the CalleD Party Number (CdPN) in the ISUP IAM message. The MSC 2 will perform number analysis and next the SSF in the MSC 2 will trigger the SCP 14 whenever a connection needs to be set up to the fixed number. To set up a connection, at the signalling level, a phone number is transmitted via the network. There are three basic ways in which number analysis can select which called numbers to forward to the SCP 14. A first way is known as "all B or all query" In this case number analysis will forward every called number to the SCP 14. Alternatively, number analysis comprises a list of phone numbers for which first the SCP 14 is accessed to check whether the final destination is correct, before the call is connected to the final destination. Instead of a list of phone numbers also a range of phone numbers or a subscription class of the phone numbers may be used. If for example, a called party has forwarded all the calls to another number, the SSF will ask the SCP 14 for every call to which number the call needs to be connected.

According to an embodiment, number analysis stores a list of UMA-subscribers for which the @home service on the SCP 14 needs to be triggered. In the case that a call will be established to an UMA subscriber, the location of the mobile phone of the UMA subscriber will be checked. There are several ways to check the location of this mobile phone. One of the options is that the SCP 14 send a MAP-ATI message (MAP-AnyTimeInterrogation) to the HLR 16 via the SSF in order to get location information of the called party. The HLR 16 will return the location information to the SSF in a MAP message. The SSF will then send the location information to the SCP 14 so that the @home service on the SCP 14 can perform appropriate actions as will be explained below. It is noted that instead of '@home', the concept '@office' or @Club may be defined implying that an area is defined which is covered by one or more WLAN APs situated in e.g. an office, club or factory, etc.

The present invention makes use of a number of location related definitions: Cell global identifier (CGI), Location area identifier (LAI), Location number (LN) and Location information (LI). These definitions are specified by 3GPP as follows:

$$CGI=MCC+MNC+LAC+CI \quad (1)$$

with
  MCC=mobile country code;
  MNC=mobile network code;
  LAC=location area code;
  CI=cell identifier.
The CGI is a globally unique identifier for a cell in a GSM radio access network. See 3GPP TS 23.003 v7.3.0, section 4.3.1.

$$LAI=MCC+MNC+LAC \quad (2)$$

The LAI is a globally unique identifier for a location area in a GSM radio access network. A LAI comprises one or more CGI's. See 3GPP TS 23.003 v7.3.0, section 4.1.

The LN is an E.164 number that is used to identify a location in a mobile network. The LN is structured as follows:

$$LN=CC+NDC+LSP \quad (3)$$

with
  CC=country code;
  NDC=national destination code;
  LSP=locally significant part.
See also 3GPP TS 23.003 v7.3.0, section 4.5.

The Location Information (LI) is a set of location elements describing the location of a subscriber in a mobile network. Depending on the type of mobile network, the LI consist of one or more of the following elements:
  CGI or LAI
  LN
  VLR address
The above list is not exhaustive. For a complete description of LI, refer to 3GPP TS 23.018 v7.4.0, section 8.3.5.1.

When the UMA-subscriber using the MS 18, see FIG. 1, is attached to the MSC 2 via WLAN (i.e. UMA access), then this is reflected in her CGI, consisting of the MCC, MNC, LAC and CI, see formula (I). The UMA access for the MS 18 is gained through the UMC 10. The UMC 10 behaves as a BSC towards the MSC 2 to which it is connected. The UMC 10 has a LAC associated with it. The LAC of the UMC 10 together with an MCC and MNC of the Mobile Network form a LAI associated with the UMC 10. When the UMA-subscriber attaches to the MSC 2 through the UMC 10, then her CGI is reported to the MSC 2. If the UMA-subscriber is under GSM access, the BSC 4 takes the place of the UMC 10. The BSC 4 also has a LAC allocated to it, which is reported to the MSC 2.

According to an embodiment, the SSF sends the UMA-subscriber's CGI to the SCP 14. The @home service on the SCP 14 will then produce a connect message meant for the MSC 2 so as to connect the call to the appropriate terminating point.

Figure 2:
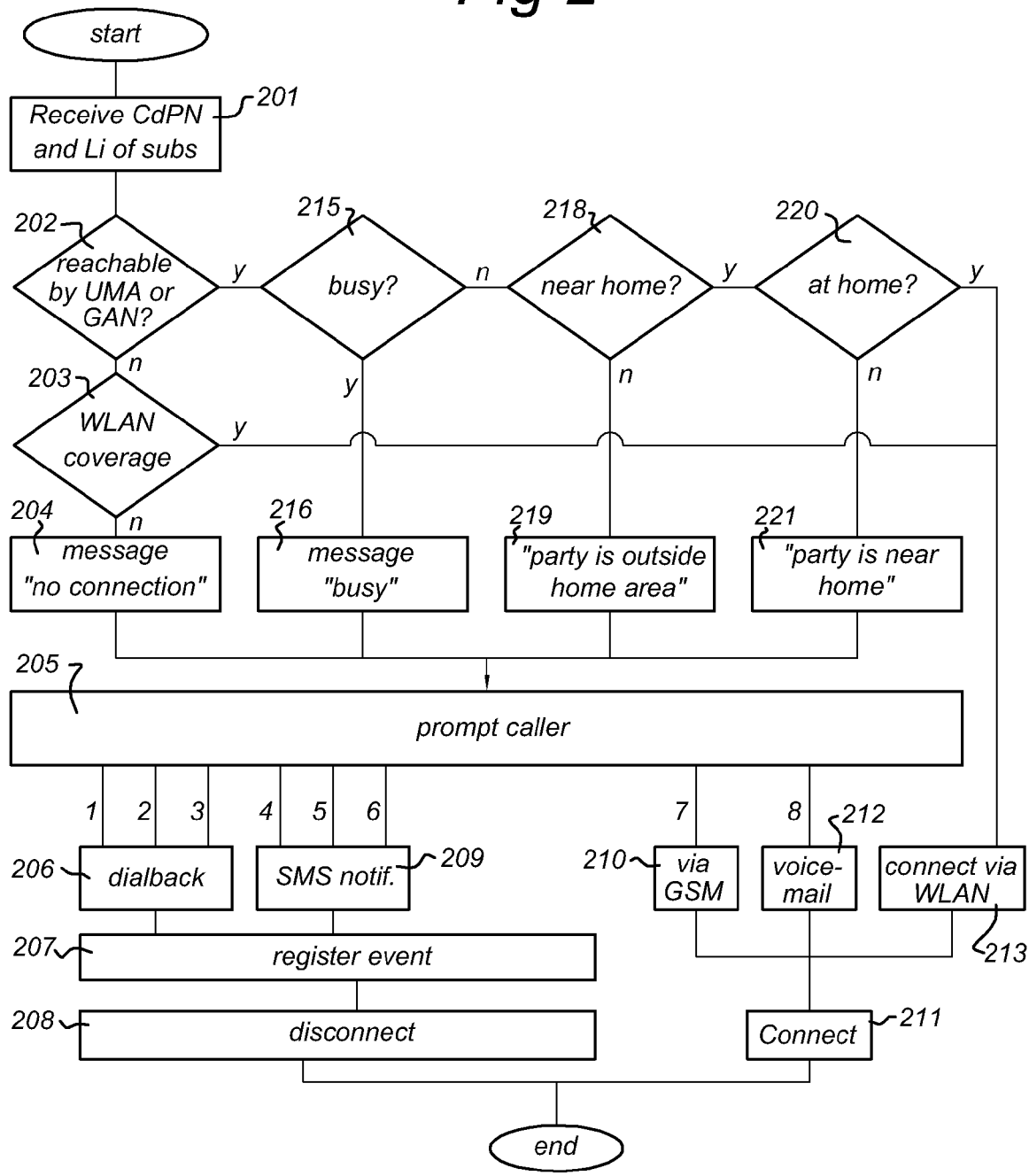
FIG. 2 shows a flow chart of actions taken by an SCP according to an embodiment of the invention.

FIG. 2 shows a flow chart depicting a method performed by the @home service according to an embodiment of the invention. The method starts by receiving a CAP message from the SSF, said CAP message comprising the Called Party Number (CdPN) and Location information of this terminating subscriber, see step 201. The @home service will first test whether the called UMA-subscriber is reachable by either GSM/UMTS or WLAN, see step 202. If the UMA-subscriber is not reachable by GSM/UMTS, a further test follows in a step 203 to see whether the UMA-subscriber is reachable via WLAN. If this is not the case, the UMA-subscriber is currently in a radio silent area or she has her mobile switched off. The @home service will now proceed with a step 204 and will send a voice message to the calling party saying that there is no connection possible. Next, in a step 205, the caller will be prompted and he will be asked to select one of the available options;
  1. Dial back when called part returns @home or @office
  2. Dial back when current conversation has ended
  3. Dial back when either WLAN or GSM/UMTS connection is restored
  4. SMS notification when called party near home or office
  5. SMS notification when called party @home or @office
  6. SMS notification when either WLAN or GSM/UMTS connection is restored
  7. Put through to GSM/UMTS and bear cost for 2nd leg of the connection
  8. Leave voice message.
If the called party is not reachable, the calling party can only select options 3, 6 or 8 out of the above mentioned list. If the calling party selects option 3, the method proceeds with a step 206 in which a call back event is produced. This call back event is then registered in the SCP 14 in a step 207. Finally, in a step 208 a Disconnect message is send back to the MSC 2.

If in step 205 the calling party selects option 6, an SMS notification is produced in a step 209 and the SMS notification is then registered in step 207. If the calling party selects option 7, the @home service will connect the calling party to the UMA-subscriber via the GSM (or UMTS) mobile network, see steps 210 and 211. The costs for the so-called $2^{nd}$ leg will then be charged to the initiating (i.e. calling) party. If in step 205 the calling party selects option 8, the @home service forwards a voice mail number to the MSC 2 and sends a Connect message, see steps 212 and 211.

If it turns out in step 203 that the UMA-subscriber is reachable by GSM/UMTS, a step 215 follows in which it is tested whether the UMA-subscriber is busy (engaged in another conversation). If this is true, a step 216 follows in which a message 'Party is currently busy' is send to the calling party. The calling party is then prompted in step 205 and the calling party may selects one of the options 2 or 8 out of the list of available options listed above. If he selects option 2, step 206 follows and step 207 and step 208. If he selects option 8, step 212 follows and then step 211.

If the outcome of the test in step 203 is 'Yes', the method proceeds with a step 213 in which a connection is made to the UMA-subscriber via the UMC 10 and the WLAN AP 12.

If the outcome of the test in step 215 in FIG. 2 is 'No', a further test, see step 218, follows in order to find out if the UMA-subscriber is near home. The @home service will compare the cell identifier (CI) in the Location information of the UMA-subscriber with CIs present in a list referred to as the "near list" associated with the UMA-subscriber. The near list comprises the CI of all the cells which at least partly overlap (with) the WLAN area of the UMA-subscriber.

If the UMA-subscriber is reachable by GSM/UMTS but not reachable by WLAN, and current radio CI is not in the "near" list, a step 219 follows in which a voice message is sent to the calling party saying that "the called party is currently outside home area". The calling party will be prompted, see step 205, and may selects options 1, 4, 5, 7 and 8 out of the above mentioned list.

If in step 218 the UMA-subscriber is in a radio cell with CI that is in the near list of the UMA-subscriber, a step 220 follows in which is tested whether the UMA-subscriber is 'at home', i.e. has WLAN access. If the UMA-subscriber is 'at home', step 213 follows and the SCP 14 will send a Connect message to the SSF in order to connect the call via the WLAN AP 12 shown in FIG. 1. If however in step 220 it is concluded that the UMA-subscriber is not 'at home', she must be 'near home'. This is communicated to the caller in step 221. The caller will be prompted to select one of the options 1, 5, 7, 8.

After step 211, the SSF will receive the correct number from the SCP 14 and will establish a connection to the correct number. Please note that the term 'number' is not necessary the same as 'telephone number'. A voice mail box associated with a telephone number will have in the network a different 'number' than the telephone.

Below, the status of the UMA-subscriber in the example of FIG. 2 is summarized:
  A. Not reachable by either GSM/UMTS or WLAN (radio silent area or mobile is switched off)
  B. Not reachable by GSM/UMTS but reachable by WLAN (inside building no GSM/UMTS coverage)
  C. Busy (engaged in an other conversation)
  D. Reachable by GSM/UMTS but not reachable by WLAN, and current radio cell-ID is not in the "near" list
  E. As above but now the radio cell-ID is in the near list The possible announcements of steps 204, 216, 219 and 221 are:
I. Party has currently no connection (switched off or radio silent area)
II. Party is close to home or office zone
III. Party is currently outside home or office area.
IV. Party is currently busy In table 1, an overview is shown with possible announcements and selections in the example of FIG. 2.

TABLE 1

| Subscriber status | Announcement | Options available |
|---|---|---|
| A | I | 3, 6, 8 |
| B | Connection to subscriber | |
| C | IV | 2, 8 |
| D | III | 1, 4, 5, 7, 8 |
| E | II | 1, 5, 7, 8 |

In the previous embodiment, a single UMA-subscriber was taken as example. According to another embodiment, the SCP 14 stores a list of UMA-subscribers (also referred to as group members) belonging to one so-called 'hunting group'. Such a list is referred to as 'hunting list'. In this embodiment, some of the options listed in table 1 are not meaningful as will be apparent to the skilled reader.

Each group member by itself has a status A-E as described in the previous example. These are now however combined. Call back or SMS notification get a slightly different meaning as they apply to any one of the group members rather then one specific member. Engaged in a conversation means that each group member is engaged. Below, a list of possible status is shown:
  A. none of the group members are inside radio coverage of either GSM/UMTS or WLAN.
  B. there is at least one group member reachable via WLAN irrespective if others have GSM/UMTS connection or not
  C. all of the group members having WLAN connection are engaged
  D. none of the group members having GSM/UMTS connection is in a cell that is covering their individual WLAN area
  E. at least one group member from the group having GSM/UMTS connection is in a cell covering an individual WLAN area, and no member of the group is WLAN connected.

An overview is given in table 2.

TABLE 2

| | | | | | |
|---|---|---|---|---|---|
| Is any mobile of group GSM/UMTS connected? | N | * | * | Y | Y |
| Is any mobile of group WLAN connected? | N | Y | Y | N | N |
| Is any mobile of group not busy? | — | Y | N | Y | Y |
| Is any mobile of group in 'near home'? | — | * | * | N | Y |
| Status | A | B | C | D | E |

\*= don't care
— = not valid

In order to be able to select a prompt and collect announcement, the SCP 14 according to an embodiment makes a first check on the possible subscriber-numbers in the hunting list whether they have currently WLAN connection and/or GSM connection. A sub list "WLAN" and the sub list "no WLAN but GSM" is filled by the SCP 14. If sub list "WLAN" and the sub list "no WLAN but GSM" are both empty, then case A applies, see table 2. If all subscribers are busy or do not answer for the B-number in the WLAN list then case C else case B a connection is made. When only the sub list "WLAN" is empty, then a check is made to see if any of the subscribers is in the radio cell that corresponds with the WLAN access, i.e. is 'near home'. If none are 'near home/office', then case D applies, else case E applies and an announcement is made saying e.g. "(one of the) subscribers is near home/office". Basically the same messages and options can be used as the embodiment with a single subscriber. In case several mobile numbers (MSISDN's) are associated with one fixed number (i.e. a hunting group is defined), the location of all these mobile phones will be checked. There are two types of possible hunting mechanisms:
  Serial ringing (where connection will be tried to set-up one after the other to all phones that are e.g. within WLAN coverage).
  Parallel ringing (where connection will be set-up simultaneously to all phones that are e.g. within WLAN coverage).

In the embodiments described above, the SCP 14 receives location information from the MSC 2 which has fetched this information from the HLR 16. Alternatively, the SCP 14 may receive the location information from a HBSC (not shown). In this case, the SCP 14 will receive update messages from the HBSC that give the necessary information. The UMA/GAN phone 18 is then registered as out the Home Zone, when there is no connection.

Figure 3:
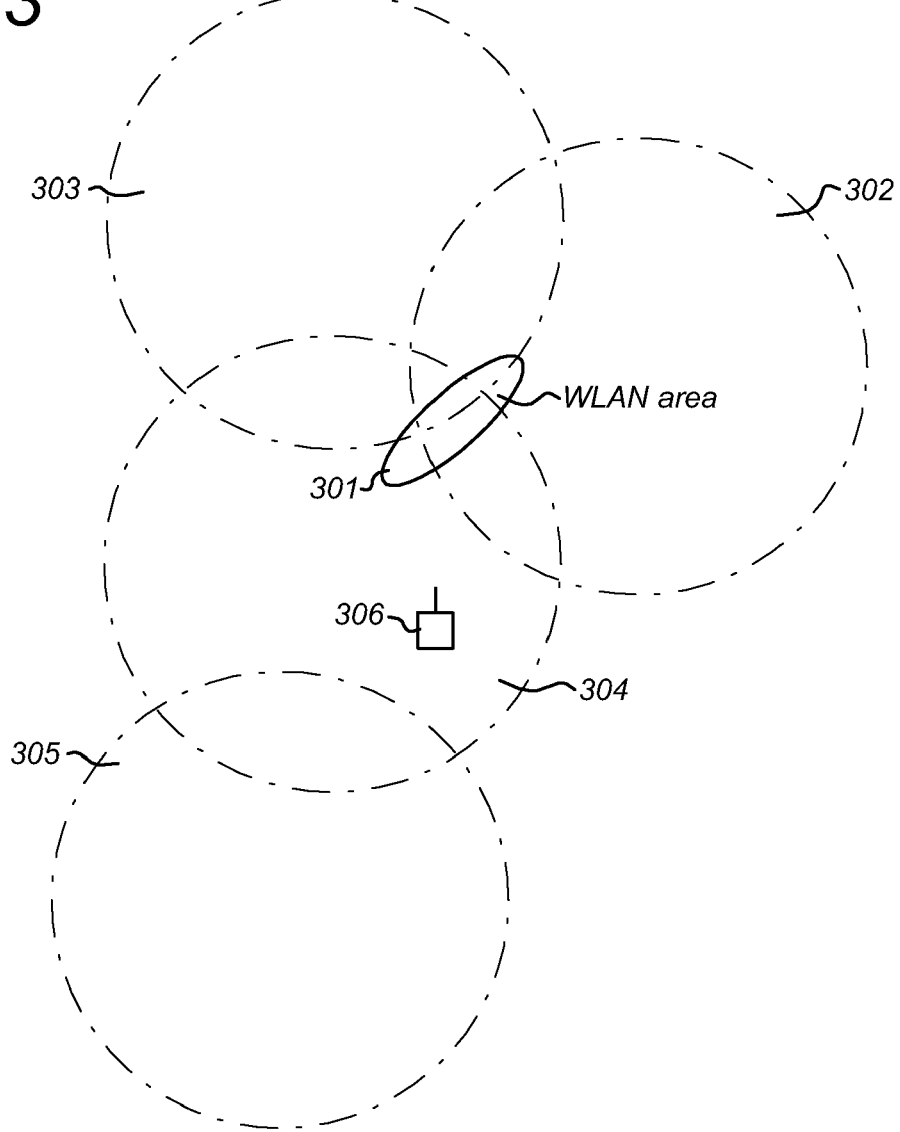
FIG. 3 shows an example of coverage areas of a WLAN and four BTSs.

FIG. 3 shows an example of coverage areas of a WLAN and four BTSs. A WLAN coverage area 301 is partly overlapped by cells 302, 303 and 304. Cell 305 does not overlap the WLAN area 301, see FIG. 3. In this situation the list of cell IDs defining 'near home' comprises the CIs of cell 302, 303 and 304 but not that of cell 305. If a called UMA-subscriber using a MS 306 is in cell 304 but not in WLAN area 301, the calling party will receive a message 'subscriber is near home'. This message will be followed by a message inviting the calling party to select one of the options 1, 5, 7 or 8 as was described with reference to FIG. 2. When choosing options 1, 5 or 8, the Calling Party will save costs as compared to option 7. If the calling Party selects option 1, he will be connected to the UMA-subscriber if the UMA-subscriber is under WLAN coverage. In that case the call will be billed as being a mobile to fixed telephone call since the Calling Party has used a fixed number. This is less expensive than a mobile to mobile call.

Figure 4:
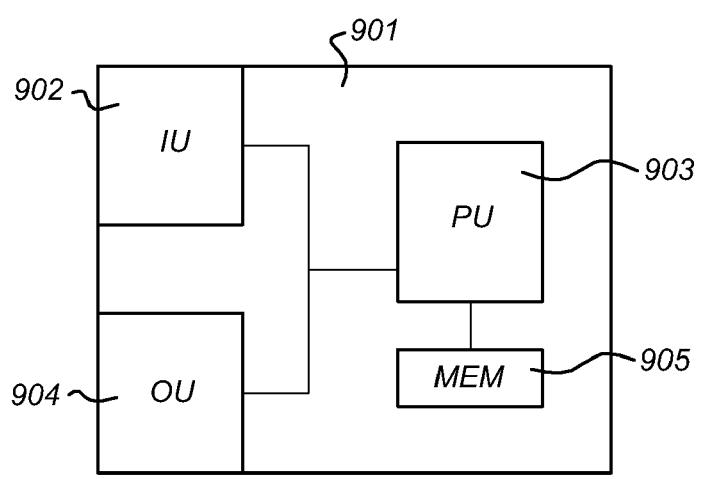
FIG. 4 shows a possible structure of network units SCP, HLR and the MSC.

The MSC 2, the SCP 14 and the HLR 16 may be implemented as network units 901, the structure of which is shown in simplified form in FIG. 4. The network unit 901 comprises a processing unit 903 connected to an input unit 902. Furthermore, the processing unit 903 is connected to an output unit 904. These allow the processing unit 903 to communicate with other network units 903 or other elements in the communication network. The processing unit 903 may comprise a general purpose central processing unit (CPU) or a group of interconnected CPUs, or alternatively a dedicated processing unit, e.g. a signal processing unit. A memory module 905 may also be provided and may be used to store data, but may also be used to store a software program comprising instructions, which allows to use the processing unit 903 for various processing functions. E.g. it is possible that one network unit 901 under the control of a software program fulfils the function of the MSC 2 and at the same time the function of the SCP 14.

The present invention has been explained above with reference to a number of exemplary embodiments. As will be apparent to the person skilled in the art, various modifications and amendments can be made without departing from the scope of the present invention, as defined in the appended claims.

The invention claimed is:

1. A method of routing a call made to a fixed telephone number of a UMA-subscriber in a telecommunication network that comprises a switching node, a location server and an intelligent network, the intelligent network comprising a service control entity, said method comprising said service control entity:

storing a list associated with said UMA-subscriber, said list comprising a cell identifier (CI) of each cell overlapping a WLAN coverage area of a WLAN AP associated with said UMA-subscriber;

receiving a trigger message from said switching node, said trigger message comprising said fixed number of said UMA-subscriber;

receiving location information of said UMA-subscriber from said switching node or from said location server, said location information comprising a cell identifier of a cell serving said UMA-subscriber; and performing a first action if said cell identifier of said serving cell is in said list, and a second action, different from said first action, if said cell identifier of said serving cell is not in said list;

wherein said first action comprises:

checking if the UMA-subscriber is currently in said WLAN coverage area of said WLAN AP associated with said UMA-subscriber; and if the result of said checking is affirmative, connecting the call to said UMA-subscriber via said WLAN AP; or if the result of said checking is negative, sending a calling party making the call a message indicating that the UMA-subscriber is currently in at least one of the cells of said list but not in said WLAN coverage area.

2. The method of claim 1, wherein if the result of said checking is negative, said first action further comprises prompting the calling party to select one out of at least one of the following options: dialing back when UMA-subscriber is in said WLAN coverage area; receiving an SMS notification when said UMA-subscriber is in said WLAN coverage area; being put through to GSM/UMTS and bearing cost for second leg of the connection; and leaving a voice message for said UMA-subscriber.

3. The method of claim 1, wherein said second action comprises:

sending a calling party making the call a message indicating that the UMA-subscriber is currently in none of the cells of said list.

4. The method of claim 3, wherein said second action further comprises:

prompting the calling party to select one out of at least one of the following options: dialing back when UMA-subscriber is in said WLAN coverage area; receiving an SMS notification when said UMA-subscriber is in at least one of said cells in said list; receiving an SMS notification when said UMA-subscriber is in said WLAN coverage area; being put through to GSM/UNITS and bearing cost for a second leg of a connection to said UMA-subscriber; and leaving a voice message for said UMA-subscriber.

5. Method of claim 1, wherein said service control entity:

stores a hunting list comprising MSISDN numbers of a plurality of mobile phones associated with said UMA-subscriber;

receives location information of each of said plurality of mobile phones from said switching node or from said location server, said location information comprising for each of said plurality of mobile phones, a cell identifier of a cell serving said mobile phone; and performs said first action if said at least one cell identifier is in said near list, and said second action, different from said first action, if none of said cell identifiers are in said near list.

6. The method of claim 1, wherein said telecommunication network further comprises a UMC connected to said switching node and having an associated location area code (LAC), and wherein said UMC:

reports said LAC to said switching node when said UMA-subscriber attaches to said switching node through said UMC.

7. A service control entity for providing intelligent network services to users of a mobile telecommunications network, said mobile telecommunications network comprising a switching node and a location server, said service control entity being connectable to said switching node and to said location server, and said service control entity comprising a processing unit, an input unit connected to the processing unit and an output unit connected to the processing unit, wherein the processing unit is arranged to:

store a list associated with said UMA-subscriber, said list comprising a cell identifier, CI, of each cell overlapping a WLAN coverage area of a WLAN AP associated with said UMA-subscriber;

receive a trigger message from said switching node, said trigger message comprising a fixed number of said UMA-subscriber;

receive location information of said UMA-subscriber from said switching node or from said location server, said location information comprising a cell identifier of a cell serving said UMA-subscriber; and perform a first action if said cell identifier of said serving cell is in said list, and a second action, different from said first action, if said cell identifier of said serving cell is not in said list;

wherein said first action comprises:

checking if the UMA-subscriber is currently in said WLAN coverage area of said WLAN AP associated with said UMA-subscriber; and if the result of said checking is affirmative, connecting the call to said UMA-subscriber via said WLAN AP; or if the result of said checking is negative, sending a calling party making the call a message indicating that the UMA-subscriber is currently in at least one of the cells of said list but not in said WLAN coverage area.

8. The service control entity of claim 7, wherein the service control entity is included as part of said mobile telecommunication network.

* * * * *

UNITED STATES PATENT AND TRADEMARK OFFICE
CERTIFICATE OF CORRECTION

| | | |
|---|---|---|
| PATENT NO. | : 8,150,390 B2 | Page 1 of 1 |
| APPLICATION NO. | : 12/668539 | |
| DATED | : April 3, 2012 | |
| INVENTOR(S) | : Bot et al. | |

It is certified that error appears in the above-identified patent and that said Letters Patent is hereby corrected as shown below:

In Column 3, Line 65, delete "(I)." and insert -- (1). --, therefor.

In Column 6, Line 8, delete "then" and insert -- than --, therefor.

In Column 8, Line 38, in Claim 5, delete "Method" and insert -- The method --, therefor.

Signed and Sealed this
Fourteenth Day of August, 2012

David J. Kappos
*Director of the United States Patent and Trademark Office*